(12) United States Patent
Creasey et al.

(10) Patent No.: US 7,590,269 B2
(45) Date of Patent: Sep. 15, 2009

(54) INTEGRATED CONTROL FOR NAVIGATION, AUTHENTICATION, POWER ON AND ROTATION

(75) Inventors: Jack Creasey, Redmond, WA (US); Leroy B. Keely, Portola Valley, CA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 11/112,836

(22) Filed: Apr. 22, 2005

(65) Prior Publication Data

US 2006/0239517 A1    Oct. 26, 2006

(51) Int. Cl.
*G06K 9/00* (2006.01)
(52) U.S. Cl. .................. 382/124; 340/5.53; 340/5.83
(58) Field of Classification Search ........... 382/124; 340/5.53, 5.83
See application file for complete search history.

(56) References Cited

U.S. PATENT DOCUMENTS

| | | | |
|---|---|---|---|
| 7,043,061 B2 * | 5/2006 | Hamid et al. ............... | 382/124 |
| 7,181,052 B2 | 2/2007 | Fujieda | |
| 2002/0030668 A1 * | 3/2002 | Hoshino et al. ............. | 345/175 |
| 2002/0130841 A1 * | 9/2002 | Scott .......................... | 345/166 |
| 2003/0203747 A1 * | 10/2003 | Nagamine ................ | 455/575.3 |
| 2005/0083310 A1 * | 4/2005 | Safai et al. .................. | 345/173 |
| 2006/0101281 A1 | 5/2006 | Zhang et al. | |
| 2006/0146027 A1 * | 7/2006 | Tracy et al. ................. | 345/168 |

OTHER PUBLICATIONS

International Search Report dtd Dec. 31, 2007, PCT/US06/15182.
U.S. Appl. No. 11/110,442, filed Apr. 20, 2005 in the name of Chunhui Zhang, et al. "Finger 10 Based Actions in Interactive User Interface".

* cited by examiner

*Primary Examiner*—John B Strege
(74) *Attorney, Agent, or Firm*—Shook, Hardy & Bacon LLP

(57) ABSTRACT

A device includes a control configured to provide 5-way navigation. The control includes a fingerprint sensor with a platen that is coupled to an actuation sensor. A user can navigate by sliding a finger across the platen so as to provide direction input. In addition, the user can make a selection by applying a center press to the platen. In an embodiment, the fingerprint sensor is a sweep sensor and is rotatably mounted to the device. The device may include a display that is configured for a first orientation that matches the orientation of the control. The display and the control may be switched to a second orientation so that the user can more efficiently use the device in the second orientation.

13 Claims, 5 Drawing Sheets

INTEGRATED CONTROL FOR NAVIGATION, AUTHENTICATION, POWER ON AND ROTATION

BACKGROUND OF THE INVENTION

1. Field of the Invention

Aspects of the present invention relate to a control suitable for information manipulation. More specifically, aspects of the present invention relate to a control that may be used on a computer related device where the control may be associated with an orientation and the control may provide for user authentication.

2. Description of Related Art

Fingerprint sensors and 5-way controls are two input elements that are each becoming popular on mobile devices, for the separate functions of authentication and navigation, respectively. As is known, the fingerprint sensor allows the user to use his or her fingerprint as a type of secret, where a match between a scanned fingerprint and a stored fingerprint allows access to programs and/or devices. The 5-way controller provides a way to navigate through a program and can provide a control interface for a device. Thus, both types of input elements are highly useful in devices, especially computer-related devices.

While useful, the five-way navigation control has an inherent problem. Five-way controls typically allow the user to provide a directional input in either the X or Y axis by pressing up, down, left or right, thus providing 4 ways of navigation. The fifth way is actuation, and the user typically presses inward (what is known as a center press) to provide this actuation. Unfortunately, users often inadvertently provide a directional input while attempting to provide a center press input or inadvertently provide the center press input when trying to obtain a directional input.

Fingerprint sensors face a different issue related to cost because they are often underutilized. For example, if the sensor is a sweep sensor, the sweep sensor can be used to detect motion in four directions but generally can only provide authentication if the user moves his or her finger in a direction perpendicular to the horizontal axis. Therefore, when used for the purpose of authentication the potential functionality of the sweep fingerprint sensor is underutilized.

While initial mobile computing devices were somewhat large and heavy, advances in manufacturing capabilities have made it possible to provide a relatively powerful computer in a small package that can be readily carried by the user. Pocket PC's and Tablet PC's are two examples of useful mobile devices. Despite the significant improvements that have been made, however, mobile device manufactures are continually looking for ways to maximize the available space because providing a larger device to accommodate additional sensors often adds weight to the device and makes the device less appealing or more difficult to carry around.

Certain types of mobile devices are readily used in different orientations. This is particularly true for mobile devices such as Pocket PC's or Tablet PC's that may be used in either a portrait orientation or a landscape orientation. For example, the portrait orientation is useful for reviewing documents. However, the landscape orientation is better suited to display video such as movies, in part because movies are typically provided in a format that better fits on a landscape orientated display. The problem with rotating between orientations, however, is that the controls are generally fixed to the device in a particular orientation and unless there is a control coupled to the device via a wire or via a wireless manner, it is not possible to rotate the display while still enjoying the proper orientation of the control.

BRIEF SUMMARY OF THE INVENTION

Aspects of the present invention relate to an improved control that addresses at least one issue described above. In an illustrative embodiment, a portable computing device includes a fingerprint sensor configured to provide 5-way navigation. Sliding an individual's fingerprint across a platen allows the user to navigate in the X and Y directions. An actuation sensor is associated with the platen of the fingerprint sensor so that when the user applies a center press the fingerprint sensor provides an actuation or selection response. The device includes a display configured to display information in a first orientation that corresponds to the orientation of the fingerprint sensor. In an embodiment, the fingerprint sensor may be positioned so as to correspond to a second orientation that corresponds to a second orientation of information being displayed on the display.

BRIEF DESCRIPTION OF THE DRAWINGS

Aspects of the present invention are illustrated by way of example and not limited in the accompanying figures in which like reference numerals indicate similar elements.

DETAILED DESCRIPTION OF THE INVENTION

Aspects of the present invention relate to various controls that may be used for at least one of navigation and authentication.

This document is divided into sections to assist the reader. These sections include: general purpose computing environment; fingerprint sensor control It is noted that various connections are set forth between elements in the following description. It is noted that these connections in general and, unless specified otherwise, may be direct or indirect and that this specification is not intended to be limiting in this respect.

General Purpose Computing Environment

Figure 1:
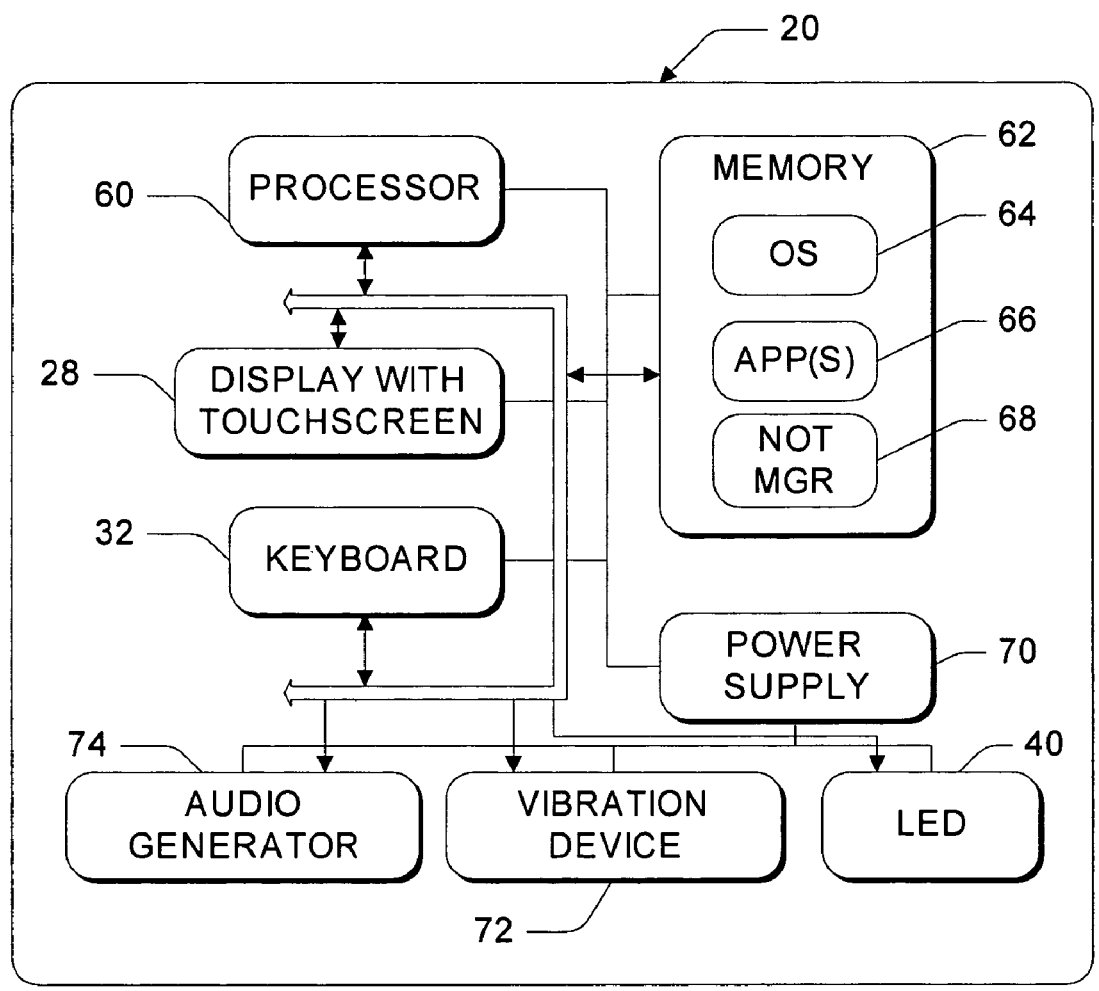
FIG. 1 illustrates a schematic representation of an illustrative computing device in accordance with aspects of the present invention.

FIG. 1 shows functional components of the handheld computing device ("H/PC") 20. It has a processor 60, a memory 62, a display 28, and a keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The H/PC 20 includes an operating system, such as the Windows® CE operating system from Microsoft Corporation or other operating system.

One or more application programs 66 are loaded into memory 62 and run on the operating system 64. Examples of applications include email programs, scheduling programs, PIM (personal information management) programs, word processing programs, spreadsheet programs, Internet browser programs, and so forth. The H/PC 20 also has a notification manager 68 loaded in memory 62, which executes on the processor 60. The notification manager 68 handles notification requests from the applications 66.

The H/PC 20 has a power supply 70, which is implemented as one or more batteries. The power supply 70 might further include an external power source that overrides or recharges the built-in batteries, such as an AC adapter or a powered docking cradle.

The H/PC 20 is also shown with three types of external notification mechanisms: an LED 40, a vibration device 72, and an audio generator 74. These devices are directly coupled to the power supply 70 so that when activated, they remain on for a duration dictated by the notification mechanism even though the H/PC processor and other components might shut down to conserve battery power. The LED 40 preferably remains on indefinitely until the user takes action. The current versions of the vibration device 72 and audio generator 74 use too much power for today's H/PC batteries, and so they are configured to turn off when the rest of the system does or at some finite duration after activation.

Figure 2:
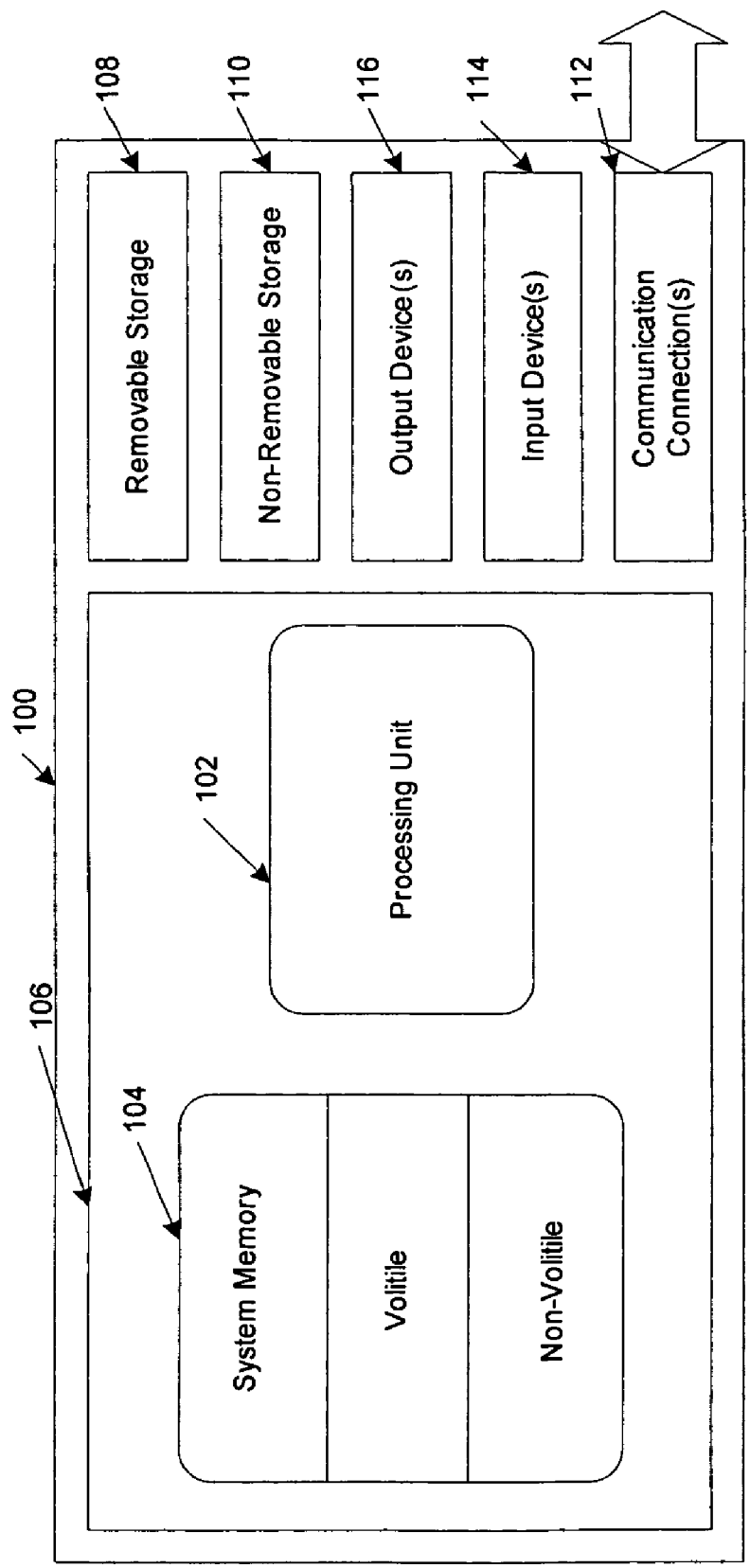
FIG. 2 illustrates a schematic representation of an alternative illustrative computing device in accordance with aspects of the present invention.

With reference to FIG. 2, an illustrative system for implementing the invention includes a computing device, such as computing device 100. In its most basic configuration, the computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, the device 100 may also have additional features/functionality. For example, the device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

The device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Thus, FIG. 2 provides additional details of a device that may be used to practice the disclosed invention. As can be appreciated by one skilled in the art, the device 100 may be portable as discussed with regard to FIG. 1.

Fingerprint Sensor Control

Figure 3:
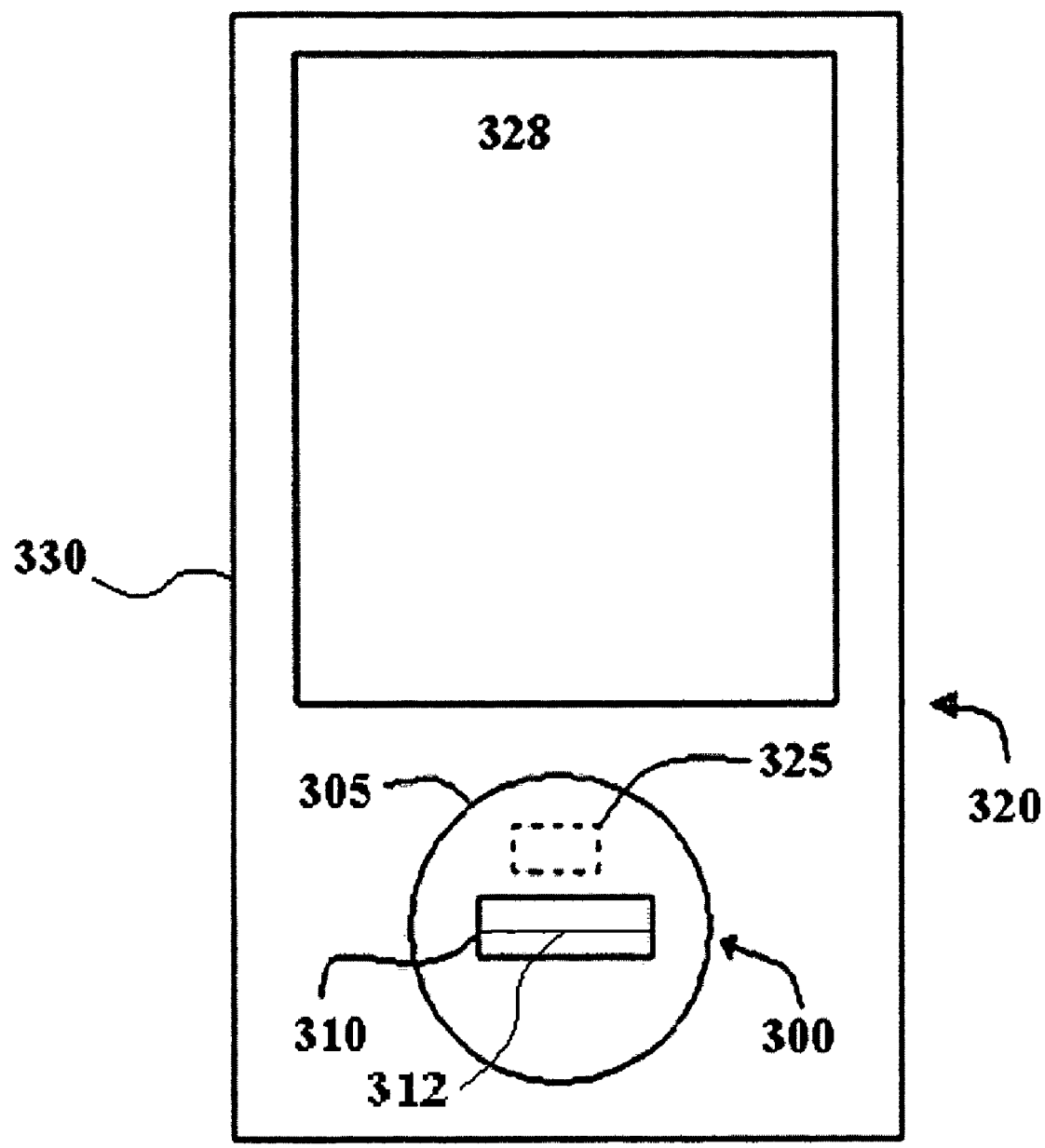
FIG. 3 shows a computing device with an illustrative control mounted on the computing device in accordance with aspects of the present invention.

Turning now to FIG. 3, a fingerprint sensor 300 is shown mounted on a housing 330 of a device 320. As depicted, the fingerprint sensor 300 includes a base 305 that supports a platen 310. The user may place a finger on the platen 310 so that the fingerprint sensor 300 may sense the user's fingerprint. An actuation sensor 325 is coupled to the platen 310. In an embodiment, the actuation sensor 325 is directly connected to the platen 310, thus the coupling is direct. In an alternative embodiment, the actuation sensor 325 is connected to the platen through one or more intermediate elements, thus the actuation sensor 325 may be indirectly coupled to the platen 310. In either case, the actuation sensor 325 is configured to sense a center press by the user, the details of which will be described below.

As depicted, device 320 includes a display 328. It should be noted, however, that device 320 could be configured without the display 328 and may simply include the housing 330 and the fingerprint sensor 300 along with some means of communicating the information sensed by the fingerprint sensor 300. Thus, the device 320 could include the housing 330, the fingerprint sensor 300 and be coupled, either in a wired or wireless manner, to the computing device 100 (FIG. 2). Alternatively, the device 320 could include additional components and features as desired and could be representative of an embodiment of the computing device 100. Thus, the fingerprint sensor 300 can be used in a number of different configurations depending on the needs of the particular situation.

With regards to the communication of information, the communication from the device 320 may be wireless or wired and may be configured to communicate with another device in proximity to the device 320 or with a device located remotely from the device 320. Thus, in this regard, remote means not proximal.

It should be noted that the platen 310 may be configured as needed in accordance with the space requirements of the device 320 and the housing 330. As depicted, the platen 310 is rectangular shaped, thus the fingerprint sensor 300 may be referred to as a sweep sensor. However, an area sensor could also be used as well. If an area sensor were to be used, the platen 310 would typically look less narrow due to the fact that an area sensor is configured to capture a larger portion of the user's fingerprint image in a single scan.

Generally speaking, sweep sensors are configured so that a portion of the user's fingerprint is captured in each scan. Thus, when a user sweeps a finger over the platen 310 the sweep sensor scans repeatedly and generates a series of images. The images are combined and the combination of the images allows the entire fingerprint image to be provided by the sweep sensor. For example, without limitation, the sweep sensor might include a platen and a charge coupled device ("CCD") configured to provide an 8 by 500 image pixel image for each scan at 500 pixels per inch resolution. The area sensor, on the other hand, is configured so that enough of the user's fingerprint image may be captured in a single scan to allow the user's fingerprint image to be used for authentication purposes. Thus, for example but without limitation, an area sensor might include the platen and the CCD configured to provide a 500 by 500 pixel image with each scan. In general, sweep and area sensor types may be used interchangeably. Thus, unless otherwise noted, a fingerprint sensor may be either a sweep sensor or an area sensor. It should be noted, however, that an area sensor may not always scan enough of the user's fingerprint to provide for authentication because the user may not use the fingerprint sensor properly.

It should also be noted that while optical-based sensors are discussed above, the fingerprint sensor can be any type of sensor configured to detect fingerprints such as a thermal-based sensor or a capacitive-based sensor. The available types of fingerprint sensors, their design, and their trade-offs are known to persons of skill in the art and are not further discussed here.

As depicted in FIG. 3, the device 320 includes a display 328. As noted above, 5-way controls are becoming popular because they are compact and allow the user to navigate on a display and select items without the controller taking up significant amounts of space. The fingerprint sensor 300 may act as a 5-way control for the device 320. For example, it might be beneficial to provide cursor control for the display 328 in both the X and Y directions. To provide the desired functionality, the fingerprint sensor 300 may detect movement of the user's finger when the user places a finger on the platen 310 and then slides the finger in a particular direction. Various algorithms for detecting motion of a finger are known, thus the particular algorithm used to determine the velocity of fingerprint movement will depend on the computing power available and other design variables. To make a selection, the user presses on the platen 310 of the fingerprint sensor 300. This pressing, which will be referred to as a center press, exerts a force on the platen 310 that can have different results, depending on the design of the actuation sensor 325.

In a first embodiment, the actuation sensor 325 may be configured to detect displacement of the platen 310. Thus, when a user provides a center press, the platen 310 will translate until the actuation sensor 325 is actuated. In such an embodiment, the actuation sensor 325 could be as simple as a contact switch. To avoid accidental actuation of the actuation sensor 325, a biasing element, such as a spring or other known biasing devices, may be configured to resist translation of the platen 310.

In an alternative embodiment, the actuation sensor 325 may be configured to detect force being exerted on the platen 310. For example, but without limitation, the actuation sensor 325 may be a force sensor such as a Piezo sensor or a QTC sensor or any other known sensor that may be configured to detect the application of force.

In one illustrative example, the fingerprint sensor 300 can provide feedback to the user when the center press is performed. This feedback may be a variety of forms, including tactile, audible and visual. For example, in an example where the platen translates in response to the center press, the feedback may be in the form of an audible click and/or a physical feeling of actuation such as can be felt when pressing a typical mouse button. This type of combination feedback is generally quite effective in alerting the user that the desired action has taken place. Beeps or flashes of light, which, for example but without limitation, may be provided by the fingerprint sensor 300, the display 328 or the device 320, can also provide feedback to the user that the actuation took place. Tactile feedback, however, may be more effective in situations where the noise or flash of light is less likely to be observed.

Thus, the fingerprint sensor 300 could provide a 5-way control for navigation. In an embodiment, the navigation could be limited to vertical and horizontal movement. However, in another embodiment, the navigation could allow for movement along a vector similar to the vector the finger moved. Thus, a movement of the user's finger along a 30 degree angle could cause a corresponding movement of the cursor along the 30 degree angle. Thus, the navigation could be made to resemble an analog controller. However, for many applications directional control limited to up, down, left and right will be sufficient.

It should be noted that the term finger as used herein refers to any finger of the user's hand, including the thumb. Thus, unless otherwise specified, the term finger is to be considered as a generic reference to one of the digits of the individual's hand.

In addition to providing 5-way navigation, the control could provide further functionality. For example, if the individual used his or her finger to navigate the cursor to the desired selection and left this finger on the platen 310 without applying the center press, the result could be a pop-up window that could provide further options or instructions to the user. Thus, the control could provide a sixth method of navigation as well.

As can be appreciated from FIG. 3, the orientation of the display 328 may be considered a portrait orientation. As noted above, for certain tasks it may be desirable to use the device 320 in the landscape orientation. It is known in the art to implement software that allows the display to be switched between a portrait and landscape orientation. However, this may cause the control orientation to be no longer aligned with the display orientation. Such a situation is less desirable because the user generally prefers to have the orientation of the control match the orientation of the display. This is particularly true for situations such as video game play where the control preferably is easy to use so as not to interfere with the immersive quality of the game play.

Furthermore, ease of use of the control is improved if the orientation of the control matches the expectations of the user. Thus, when providing a sweep sensor such as illustrated in FIG. 3, the user generally expects to sweep the finger in a direction perpendicular to the longitudinal axis 312 of the platen 310. Therefore, while not required, it is advantageous to allow the user to user the sweep sensor in the perceived proper manner so that the use of the control is more intuitive and natural.

Figure 4A:
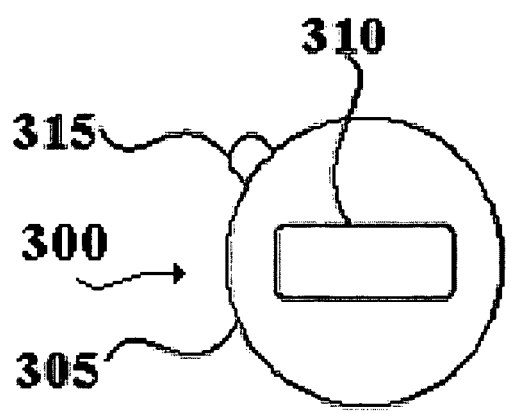
FIG. 4a illustrates an illustrative control in a first orientation in accordance with aspects of the present invention.
Figure 4B:
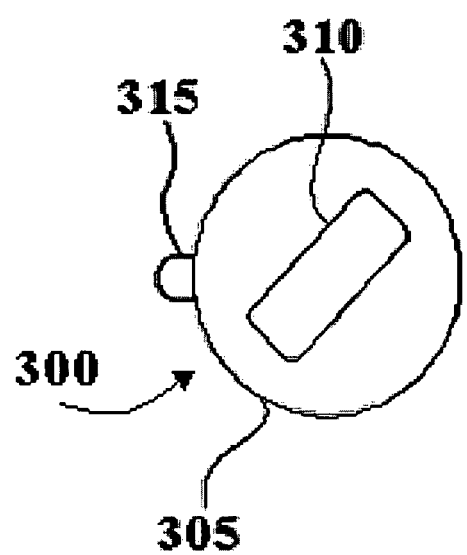
FIG. 4b illustrates the control of FIG. 4a rotated from the first orientation in accordance with aspects of the present invention.
Figure 4C:
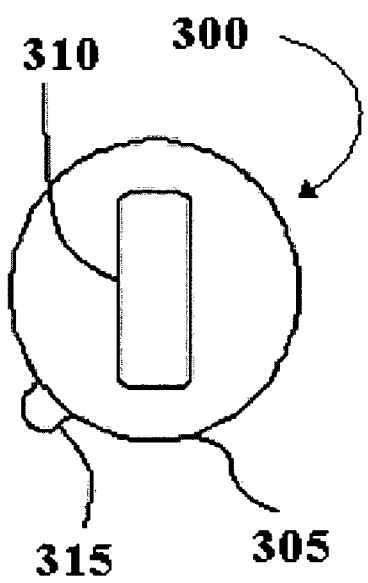
FIG. 4c illustrates the control of FIG. 4a in a second orientation in accordance with aspects of the present invention.

Therefore, if the device 320 were to be rotated 90 degrees so as to provide a better orientation for video playback, one can also rotate the control, which may be provided by the fingerprint sensor 300. FIGS. 4a-4c illustrate a method of providing such a desired change in orientation. Looking at FIG. 4a, the platen 310 of the fingerprint sensor 300 is mounted on the base 305 that may be mounted to a housing 330 as depicted in FIG. 3. A projection 315 may extend from the base and could provide an orientation indication so that the user can readily discern the orientation of the control. Other indicia or methods to indicate the orientation of the control could also be used. For instance, the control could have a pattern or graphic that indicated the orientation of the control. The base 305 is rotatably mounted to the housing 330. For example, but without limitation, the base 305 could include a shaft that mates with a sleeve on the housing in a known fashion (not shown). Numerous other methods of rotatably mounting exist and may be utilized as desired. Thus, the platen 310 may be rotatably supported by the housing.

FIGS. 4b and 4c illustrate the platen 310 and base 305 rotating toward a second orientation, where the second orientation might be used in a device where it was desired to switch between two orientations such as portrait and landscape. Electrical contacts could be provided so that once the sensor is rotated, the change in the circuit would indicate that the control had been rotated. To ensure proper rotation, an over-center feature may be added so that once the fingerprint sensor 300 is rotated more than halfway a biasing element can cause the fingerprint sensor 300 to rotate the rest of the way in a known manner. While depicted as rotating about 90 degrees, other angles of rotation are possible depending on the design of the device. For example, other rotation angles may include 30, 45, 60, 180 and 360 degrees and other rotation angles may be configured to accommodate the user's hand position.

In an embodiment, the base 305 is configured to allow the user to rotate the base 305 as desired. For example, the base 305 may be configured to extend so as to allow the user to grip the base 305 and rotate it as desired. In an alternative illustrative embodiment, the rotation of the base 305 may be caused by the rotation of another object such as a display on a Tablet PC through a gear system. In an alternative illustrative embodiment, the control could be rotated by servo motors in response to either software or hardware input (for instance, accelerometers may detect the rotation of the device or display on the device and rotate base 305 accordingly). If the base 305 is configured to rotate, however, it may be beneficial to configure the actuation sensor 325 so that it detects the application of force applied to the platen 310 rather than the displacement of the platen 310. This will avoid potential issues with the design of the components that otherwise would need to allow for both rotation and displacement.

As previously noted, the fingerprint sensor 300 may use the area sensor rather than the sweep sensor when providing the 5-way navigation. Because of the size of the platen 310 in the area sensor, it generally is not necessary to rotate the control when the orientation of the device is changed. Depending on the application, however, it may be beneficial to adjust the orientation of the cursor movement in response to the user input while the display is in the second orientation mode. Thus, the use of the area sensor in combination with the actuation sensor 325 configured to detect the application of force could allow for a control that would work in portrait or landscape orientation without the need to include moving parts because the change in orientation could be triggered by software. This would allow for a control with an increase degree of reliability and a reduced likelihood of premature wear while still allowing for flexibility in orientation. An advantage of using the rotating sweep sensor to provide similar functionality, however, is that a smaller sensor may be utilized and the user may be more aware of what orientation mode the device is in because the orientation of the control may be used to control the orientation of the display and the control can be readily equipped with indicia indicating the current orientation.

If an area sensor is used, it may be useful to provide an orientation indicator, either on control or adjacent the control, that provides clues to the user as to the orientation of the control. The orientation indicator may be as simple as an area of illumination to indicate what should be considered the top of the control.

While the use of the fingerprint sensor 300 has been primarily discussed with regard to navigation, the fingerprint sensor 300 may have other uses. As is known in the art, fingerprint sensors are suitable for use in authenticating the user. Furthermore, the fingerprint sensor 300 may also be used as a power-on switch. The ability to use the fingerprint sensor 300 for more than one function thus increases the use and the value of the fingerprint sensor 300. Depending on the type of device and how it is configured, the fingerprint sensor 300 may be one of many control interfaces or may be the only control interface provided for the device.

Figure 5:
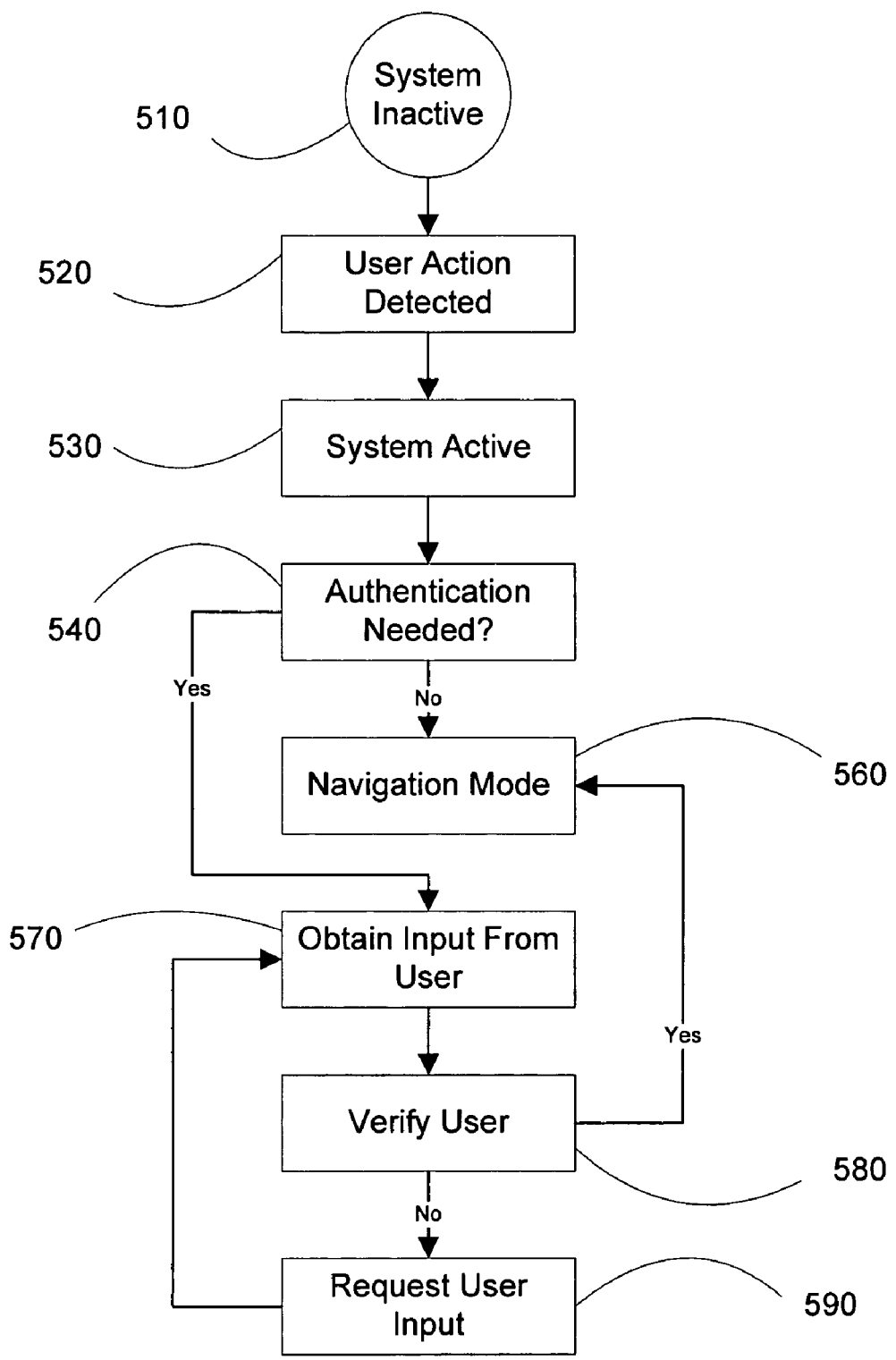
FIG. 5 illustrates an illustrative algorithm that may be used in conjunction with a control in accordance with an embodiment of the present invention.

FIG. 5 illustrates a process that may be used to provide additional functionality with the fingerprint sensor 300. In step 510 the system is inactive. In this context, the term inactive means not being used by the user. Thus, the system could be off, suspended, locked, or in some sort of altered state with changes being made in response to devices per se or devices based on whether they are considered trusted or not. It should also be noted that the term system may refer to the device, a program running on the device, the device connected to another device or some combination thereof. Of course, if the system does not need to operate in a reduce power consumption state then the inactivity could be similar to a computer with a screen saver running. However, for portable devices with limited battery power and for devices where increased efficiency is preferred it is generally desirable to allow the system to rest in a state of decreased power consumption. Of course, if the system is locked, then it may be that a task is being accomplished by the locked system. In such a case it may be less desirable to reduce the power consumption because any reduction in power may have an impact on the work that is being accomplished.

Turning to step 520, the user causes the fingerprint sensor to detect some sort of user input that indicates the system should be powered on. The user input may be the application of the center press on the platen 310 or it could be the placement of a finger on the platen 310. The user could also sweep a finger across the platen 310. In the case of the rotatably mounted fingerprint sensor 300 as depicted in FIG. 4a-4c, the rotation of the fingerprint sensor 300 could also be used to provide the desired user input. Variations of the above types of user inputs may also be used.

In step 530 the system is activated. As noted previously, this may mean the device is turned on, the program module running on the device changes states or some other device is turned on. Next, in step 540 the system determines whether user authentication is required. If authentication is not required, then the system switches to navigation mode in step 560 and the fingerprint sensor 300 may be used as discussed above. Typically, authentication is not required in situations where the user is not concerned about protecting information within the system or the hassle of providing authentication is such that the user deactivates the authentication feature. However, deactivating the authentication feature greatly diminishes the security of the system and therefore it is preferable to require user authentication.

If authentication is required, the system switches to authentication mode and next obtains input from the user in step 570. It should be noted that with the fingerprint sensor 300, the act of providing input to the sensor in order to activate the system can also provide the user input needed to obtain authentication of the user. This ability, if used, may reduce the effort needed to provide user authentication and therefore make it more likely that the user chooses to include the authentication steps.

If the initial user input that was provided in step 520 did not provide sufficient data to allow for user activation, step 570 may prompt the user to provide user input. As is known, user input for authentication may include passwords. However, in an illustrative embodiment the fingerprint sensor 300 may be used to provide the required user input.

Next, in step 580 the user input is used to verify whether the user should be given access. If the fingerprint sensor 300 was being used to provide the user input, the scanned fingerprint could be converted to a data set that was representative the user's finger and compared to stored data sets. A match would indicate that the user was authorized and the system would go to the navigation mode of step 560. If the user's input did not match an expected value, in step 590 the user would be requested to reenter the user input and step 570 would be repeated. The number of times the user may be permitted to reenter the user input in step 570 could be limited as a security measure. It is also possible that the system will include a local mode that provides the user with limited functionality before the user is authenticated and the fingerprint sensor 300 may be used to navigate in the local mode.

It should be noted that during authentication mode (steps 570 through 590) the fingerprint sensor 300 is primarily being used to provide data representative of a user's fingerprint. For a sweep sensor this involves having the user sweep the user's finger in a direction perpendicular to the longitudinal axis of the sweep sensor. However, the fingerprint sensor 300 may still be configured to detect and respond to other inputs. For example, if movement in the X direction allows the sensor to scan a fingerprint, movement in the Y direction can be used to provide other functionality such as indicating a request to go back and repeat a step. The center press could be used as a selector. Thus, even in authentication mode the control can still provide additional functionality that may be used for navigation or other desired uses. Of course, if the fingerprint sensor 300 (FIG. 3) is configured with the area sensor, all directions of movement may be available for navigation. Therefore, the fingerprint sensor 300 may provide certain navigational functionality, the level of functionality which may depend on the configuration of the system and the type of fingerprint sensor, while waiting for the user to become authenticated. Alternately, the sweeping described above may become part or all of the authentication process.

The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. A control for mounting on a device to provide a user with 5-way navigation, the control comprising:
 a fingerprint sensor, the fingerprint sensor including a platen, wherein the fingerprint sensor is configured to detect motion of a finger sliding across the platen, the fingerprint sensor is a sweep sensor, and is rotatably attached to the device;
 an actuation sensor coupled to the fingerprint sensor, the actuation sensor configured to detect a center press; and
 a base rotatably mounted to the device to facilitate supporting the platen, wherein the base is configured to selectively rotate between a first position and a second position, the first and the second position being 90 degrees apart, the first position being configured to provide authentication with the control, and the second position being configured to provide 5-way navigation with the control.

2. The control of claim 1, wherein the actuation sensor detects displacement.

3. The control of claim 1, wherein the actuation sensor detects force.

4. The control of claim 1, wherein the control provides feedback to the user indicating the center press occurred.

5. A computing system, comprising:
 a housing, the housing coupled to a processor, a memory module, a display and a power source;
 a control supported by the housing, wherein the control is rotatably mounted to the housing, and is rotatable between a first orientation and a second orientation, the control comprising:
 a fingerprint sensor including a platen, the fingerprint sensor configured to detect movement of a finger across the platen, wherein the fingerprint sensor is a sweep sensor rotatably connected to the housing; and
 an actuation sensor associated with the platen, the actuation sensor configured to detect a center press applied to the platen;
 wherein the system is switchable between a first mode and a second mode, the first mode being configured to provide authentication with the control, and the second mode being configured to provide 5-way navigation with the control.

6. The system of claim 5, wherein the system provides feedback that a center press has been applied.

7. The system of claim 5, wherein the control provides partial navigation functionality in the first mode.

8. The system of claim 5, wherein the control activates the system in response to a user input.

9. A computing device configured to allow a user to navigate, the device comprising:
 a processor coupled to a memory module and a display, the memory module including processor executable code configured to allow the user to navigate on the display;
 a fingerprint sensor supported by the device, the fingerprint sensor including a platen, the fingerprint sensor configured to sense movement of a fingerprint over the platen, wherein the fingerprint sensor can rotate between a first orientation and a second orientation, the first and the second orientations being 90 degrees apart, and the orientation on the display is automatically adjusted in response to orientation of the fingerprint sensor;
 an actuation sensor associated with the platen, the actuation sensor configured to detect a center press; and
 wherein the device is switchable between a first mode and a second mode, the first mode being configured to provide authentication of the user through the scanning of a fingerprint by the fingerprint sensor, and the second mode being configured to provide for 5-way navigation with the fingerprint sensor.

10. The device of claim 9, wherein the fingerprint sensor is a sweep sensor.

11. The computing device of claim 9, wherein the fingerprint sensor is a sweep sensor and the device is configured to provide at least one additional type of functionality through the use of the fingerprint sensor while in the first mode.

12. The computing device of claim 9, wherein the device is configured so as to become activated in response to a user input provided to the fingerprint sensor.

13. A control for mounting on a device to provide a user with 5-way navigation, wherein the control provides feedback to the user indicating the center press occurred and the control provides partial navigation functionality in a first position, the control comprising:
 a fingerprint sensor, the fingerprint sensor including a platen, wherein the fingerprint sensor is configured to detect motion of a finger sliding across the platen, the fingerprint sensor is a sweep sensor and the fingerprint sensor rotatably attached to the device;

an actuation sensor coupled to the fingerprint sensor, the actuation sensor configured to detect a center press, wherein the actuation sensor detects displacement and force; and a base, the base supporting the platen, the base rotatably mounted to the device, wherein the base is configured to selectively rotate between the first position and a second position, the first and the second position being 90 degrees apart, the first position being configured to provide authentication with the control, and the second position being configured to provide 5-way navigation with the control, and wherein once the platen is rotated more than halfway to the second position a biasing element causes the platen to automatically rotate to the second position.

* * * * *

UNITED STATES PATENT AND TRADEMARK OFFICE
CERTIFICATE OF CORRECTION

PATENT NO. : 7,590,269 B2 Page 1 of 1
APPLICATION NO. : 11/112836
DATED : September 15, 2009
INVENTOR(S) : Creasey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Twenty-first Day of September, 2010

David J. Kappos
*Director of the United States Patent and Trademark Office*